UNITED STATES PATENT OFFICE.

MAX H. ISLER, OF MANNHEIM, GERMANY, ASSIGNOR TO BADISCHE ANILIN & SODA FABRIK, OF LUDWIGSHAFEN, GERMANY, A CORPORATION OF GERMANY.

ANTHRAQUINONE DYE AND PROCESS OF MAKING SAME.

SPECIFICATION forming part of Letters Patent No. 690,292, dated December 31, 1901.

Application filed October 8, 1901. Serial No. 78,000. (No specimens.)

*To all whom it may concern:*

Be it known that I, MAX HEINRICH ISLER, chemist, a citizen of the Swiss Republic, residing at Mannheim, in the Grand Duchy of Baden, Germany, have invented new and useful Improvements in new Anthraquinone Coloring-Matters and Processes of Producing the Same, of which the following is a specification.

Upon treating mono-amido-beta-methyl-anthraquinone with bromin brom-amido-methyl-anthraquinone is obtained. If this brominated body be treated with potassium nitrite in concentrated sulfuric acid on the water-bath, the amido group is replaced by a hydroxyl group. Similarly, also, an analogous chlorin derivative can be obtained. I have discovered that this brom or chlor hydroxy-methyl-anthraquinone can readily be made to react with aromatic amins, whereby new coloring-matters are produced, which in the form of sulfo-acids dye wool violet shades of greater brightness than those obtained from any alizarin colors hitherto known.

The following examples will serve to further illustrate the nature of this invention and the manner in which the same may be carried into practical effect; but the invention is not confined to these examples. The parts are by weight.

Example 1: Mix together ten (10) parts of brom-hydroxy-methyl-anthraquinone, ten (10) parts of sodium acetate, (free from water,) and one hundred (100) parts of para-toluidin. Heat the mixture so that it boils and maintain the heat until no further formation of coloring-matter can be observed. Dilute the melt with three (3) times its weight of alcohol and allow it to cool. The new coloring-matter separates out in the crystalline form. Collect by filtering, and if it be desired to purify recrystallize from glacial acetic acid. The filtrate upon treatment with dilute hydrochloric acid yields a coloring-matter which upon sulfonation dyes wool, yielding greener and duller shades than the sulfo-acid of the main product.

In the foregoing example the sodium acetate prescribed need not be added; but it improves the yield of the coloring-matter. Instead of para-toluidin other aromatic amins can be employed, such as anilin, which yields a similar coloring-matter. The brom-hydroxy-methyl-anthraquinone can be replaced by the corresponding chlorin derivative.

Example 2: Add ten (10) parts of the coloring-matter obtained according to the foregoing example (using anilin) to two hundred (200) parts of sulfuric acid, (monohydrate.) Stir the mixture at the ordinary temperature for about eight (8) to ten (10) hours or at the temperature of the water-bath for one (1) or two (2) hours until a test portion of the coloring-matter has become completely soluble in hot water. Pour the melt into water, precipitate by means of common salt or potassium chlorid, filter, wash with common salt solution, press, and dry. Instead of sulfonating with monohydrate other concentrated acid or fuming acid, with or without the addition of boracic acid, can be used.

The following table shows some of the reactions and properties of certain coloring-matters obtained according to my invention:

|  | Coloring-matter from brom-hydroxy-methyl-anthraquinone and— | |
| --- | --- | --- |
|  | Anilin. | Toluidin. |
| *(a) Unsulfonated.* | | |
| Appearance of the coloring-matter. | Violet-brown | Dark violet. |
| Solution in concentrated sulfuric acid. | Blue-green | Blue-green. |
| Solution in concentrated sulfuric acid and boracic acid. | Violet | Blue. |
| Solution in alcohol | Red-violet | Violet. |
| Solution in anilin | Blue-violet | Blue. |
| *(b) Sulfonated.* | | |
| Dyes unmordanted wool | Red-violet | Pure violet. |
| Dyes chrome mordanted wool | Duller violet | Blue-green. |
| Solution in water | Violet | Violet-blue. |
| On addition of caustic soda | Blue | Blue. |
| Solution in concentrated sulfuric acid. | Red-violet | Do. |
| The same upon addition of boracic acid. | Becomes considerably redder. | Becomes redder. |
| Solution in alcohol | Violet-red | Blue-violet. |
| Solution in anilin | Very difficultly soluble. | Blue. |
| Solution in pyridin | Violet-red | Do. |

What I claim is—

1. The manufacture of coloring-matter by condensing halogen-hydroxy-methyl-anthraquinone with primary aromatic amins, substantially as described.

2. The manufacture of coloring-matter by condensing halogen-hydroxy-methyl-anthraquinone with primary aromatic amins and sulfonating the product thus obtained, substantially as described.

3. The new coloring-matter such as can be obtained by condensing halogen-hydroxy-methyl-anthraquinone with primary aromatic amins which in the unsulfonated form dissolves in sulfuric acid with a blue-green color and in sulfuric acid, to which boracic acid has been added, with a violet to blue color, whose solution in anilin is blue-violet to blue, and in alcohol violet, which in the sulfonated form dissolves in water yielding a violet solution, this solution on the addition of caustic soda becoming blue, which dissolves in concentrated sulfuric acid the solution being red-violet to blue and becoming redder on the addition of boracic acid, whose alcoholic solution is violet, and which dyes unmordanted wool violet shades, substantially as described.

4. The new coloring-matter such as can be obtained by condensing brom-hydroxy-methyl-anthraquinone with para-toluidin, which in the unsulfonated form dissolves in sulfuric acid with a blue-green color, this color on the addition of boracic acid becoming blue, whose solution in anilin is blue and in alcohol violet, which in the sulfonated form dissolves in water yielding a violet-blue solution, this solution on the addition of caustic soda becoming blue, and in sulfuric acid with a blue color, this solution on the addition of boracic acid becoming redder, whose alcoholic solution is blue-violet and which dyes unmordanted wool pure violet shades, substantially as described.

In testimony whereof I have hereunto set my hand in the presence of two subscribing witnesses.

MAX H. ISLER.

Witnesses:
ERNEST F. EHRHARDT.
JACOB ADRIAN.